Figure 1:
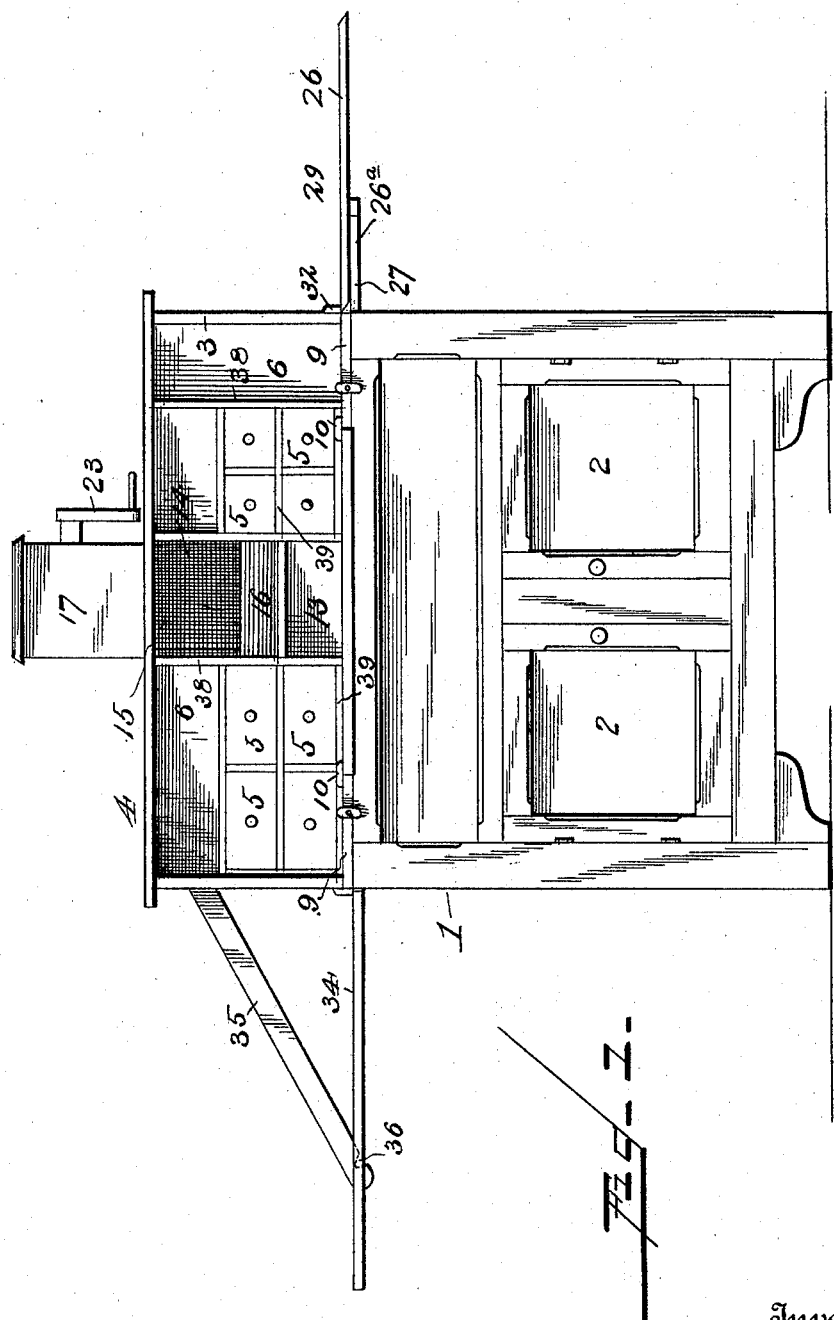

(No Model.) 3 Sheets—Sheet 1.

W. H. HERRICK & H. C. CROSSLEY.
KITCHEN CABINET.

No. 586,185. Patented July 13, 1897.

Witnesses
F. L. Ouraud.
A. B. Wilson.

Inventors
Wm H. Herrick
Harry C. Crossley.
By Benj. G. Cool
Attorney (No Model.) 3 Sheets—Sheet 2.
W. H. HERRICK & H. C. CROSSLEY.
KITCHEN CABINET.
No. 586,185. Patented July 13, 1897.
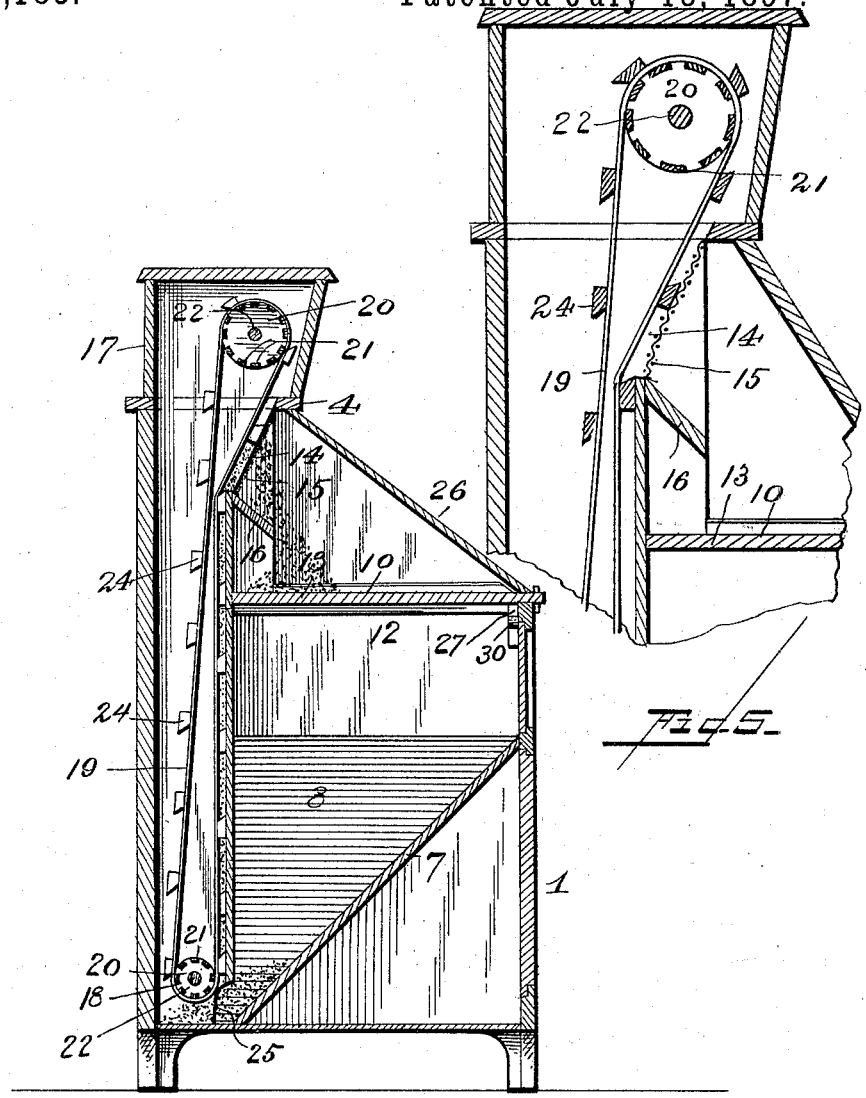
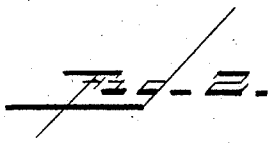
Witnesses
F. L. Ourand.
H. B. Wilson.
Inventors,
Wm H. Herrick
Harry C. Crossley.
By Benj. G. Owl
Attorney
THE NORRIS PETERS CO., PHOTO-LITHO., WASHINGTON, D. C.

(No Model.) 3 Sheets—Sheet 3.
W. H. HERRICK & H. C. CROSSLEY.
KITCHEN CABINET.
No. 586,185. Patented July 13, 1897.
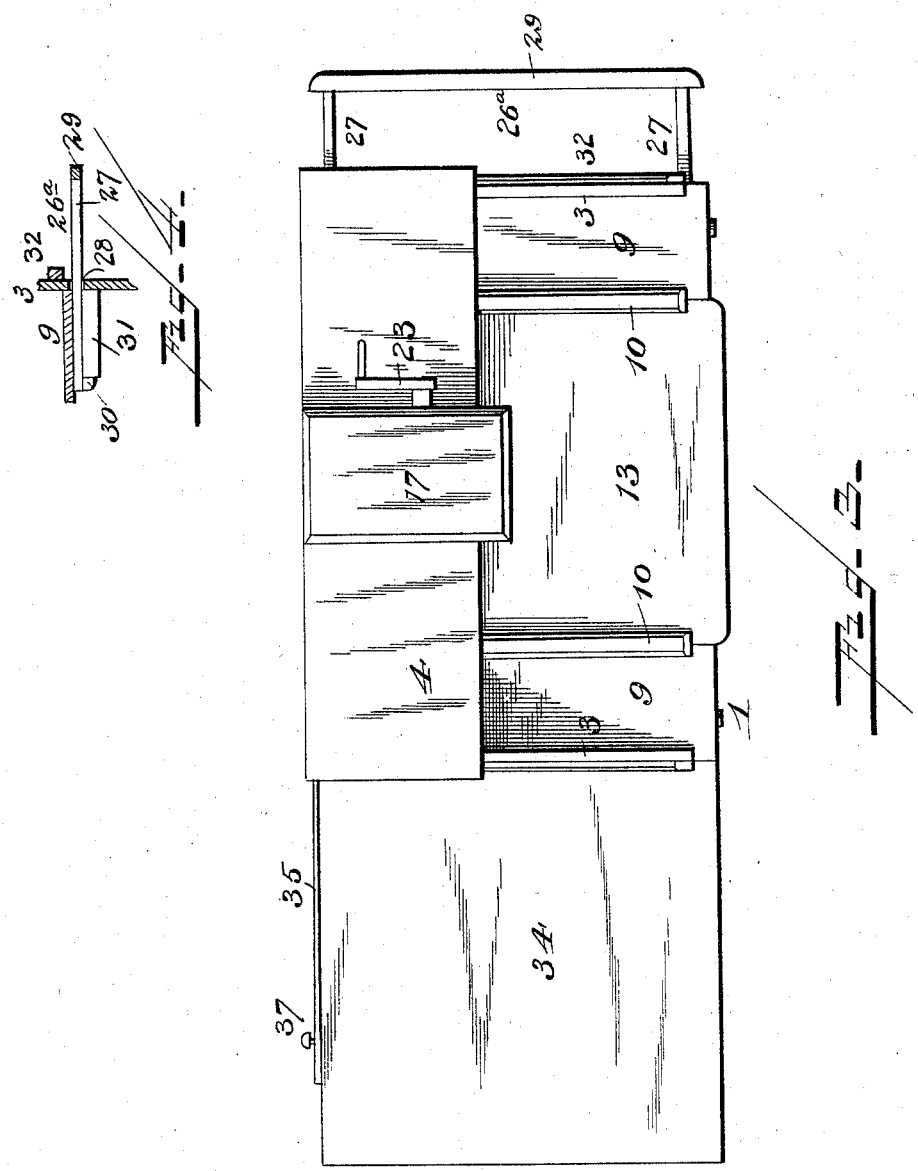
Witnesses
F. L. Ourand
Inventors
Wm H Herrick
Harry C. Crossley.
By Benj. G. Cool
Attorney

United States Patent Office.

WILLIAM H. HERRICK AND HARRY C. CROSSLEY, OF IRONTON, OHIO.

KITCHEN-CABINET.

SPECIFICATION forming part of Letters Patent No. 586,185, dated July 13, 1897.

Application filed September 12, 1896. Serial No. 605,587. (No model.)

*To all whom it may concern:*

Be it known that we, WILLIAM H. HERRICK and HARRY C. CROSSLEY, citizens of the United States, residing at Ironton, in the county of Lawrence and State of Ohio, have invented certain new and useful Improvements in Kitchen-Cabinets; and we do hereby declare the following to be a full, clear, and exact description of the invention, such as will enable others skilled in the art to which it appertains to make and use the same.

Our invention relates to an improved kitchen-cabinet combining in its structure a flour bin or receptacle for containing flour, an elevator for elevating the flour to the top of the cabinet and delivering or dumping it onto a removable kneading-board, a sieve or screen at the upper end of the elevator for screening the flour as it is delivered to the kneading-board, a removable top for the cabinet adapted to be connected with one side of the cabinet and serve as a table-leaf, a folding leaf at the opposite side, and a series of drawers for containing different articles and a series of compartments to receive pie-pans and other utensils.

The invention consists in the novel construction and combination of parts hereinafter fully described and claimed.

In the accompanying drawings, Figure 1 is a front elevation of a kitchen-cabinet, the top being removed, constructed in accordance with our invention. Fig. 2 is a central transverse section of the same, the cover being in place. Fig. 3 is a plan view, the cover being removed and the slide which supports the cover when the latter serves as a table-leaf being extended to receive the cover. Fig. 4 is a sectional view of the slide. Fig. 5 is a sectional view, on an enlarged scale, of the upper portion of the cabinet.

In the said drawings the reference-numeral 1 designates the cabinet, comprising a rectangular casing provided at the front with two hinged doors 2. The upper ends of the sides 3 of the cabinet are extended upwardly and the front beveled, so as to slope or incline downwardly, as seen in Fig. 2. Said sides are connected by means of a stationary top 4, thus forming an auxiliary casing to receive a number of sliding drawers 5 and provided with a number of compartments 6 to receive pans and other utensils. Located in said cabinet is a flour-bin formed by the back of the cabinet and the inclined or sloping front and side walls 7 and 8. The top of said cabinet at each end is provided with transverse boards 9, secured thereto, the inner edges of which are provided at top and bottom with projecting cleats 10 and 12, forming ways for a removable kneading-board 13.

Located at the rear of the casing is a vertical flour-elevator comprising a rectangular casing, the lower end of which extends down into the contracted lower portion of the flour-bin. The front of said elevator at the upper end is cut away, forming an opening 14, and the sides thereof are beveled or inclined upwardly to the stationary top 4. Secured to said beveled sides is a sieve or screen 15, which inclines forwardly, as seen in Fig. 2. At the lower end of said sieve is a downwardly-inclined deflecting-plate 16, which delivers the flour from the sieve to the kneading-board below. At the top of the elevator is a box 17, secured to the top 4 and communicating with the elevator. At the lower end of the elevator is journaled a roller 18, around which passes an elevating endless belt or band 19, which also passes around a similar roller in the box 17, but in a different plane from said lower roller. These rollers comprise the shafts 22, the heads or disks 20, and the connecting-bars 21. The shaft 22 of the upper roller is provided with a crank 23, by which it may be rotated to operate the belt or band. At regular intervals apart the outside of said belt or band is provided with cleats 24, which serve to catch the flour, which falls into the casing from the bin through an opening 25 in the lower end of the casing. By reason of the said rollers being located in different planes, as before stated, the two runs of the belt or band 19 will run perpendicularly until the front run comes to the inclined sieve, when it will incline forwardly, so that the slats or cleats will strike the sieve with a quick movement and thus serve as knockers to shake or vibrate the sieve and thus free it from any flour which may adhere thereto and tend to clog the same.

The numeral 26 designates the removable top to the cabinet, having its top and bottom edges beveled, as seen in Fig. 2.

The numeral 26ª designates a slide at one end of the cabinet, consisting of two horizontal arms 27, projecting through and working in openings 28 in one side of the cabinet and connected together at the outer ends by a transverse bar 29. The inner ends of the arms 27 are formed with lugs 30, which engage with cleats 31, secured to the cabinet, and thus serve to limit the outward movement of the slide.

On the exterior of the cabinet is a transverse bar 32, located just above the slide, so that when the slide is extended and the top placed thereon to serve as a table-leaf the beveled edge of the latter will engage under the bar 32 and thus be retained in place.

At the opposite side of the cabinet is a leaf 34, hinged thereto, which when not in use drops down and hangs against the side of the cabinet. When raised, the leaf is held in a horizontal position by means of a hinged or pivoted arm 35, having a notch 36 near its free end, which engages with a pin 37, secured to said leaf.

The numerals 38 and 39 designate horizontal and vertical partitions which form the compartments for the sliding drawers and for the pans and other utensils.

The operation is as follows: When in use, the top of the cabinet is removed and the kneading-board slid in the ways, so as to cover the upper end of the flour-bin. The slide may also be extended and the top placed thereon to serve as a table-leaf to hold various articles or objects. By now rotating the upper roller of the elevator by means of the crank the elevating-belt will be operated, the front run thereof traveling upwardly and the rear run traveling downwardly. During this movement of the belt the cleats or slats thereof will catch the flour entering the lower end of the casing and carry it upward, the said cleats or slats bearing against the inner side of the front of the casing, so as to prevent the escape of the flour back to the lower end of the casing. When the said cleats reach the lower end of the inclined sieve, they will spring suddenly forward, owing to the tension of the belt or band, striking and agitating the sieve. The cleats will also travel upward in contact with the sieve and also aid in freeing the interstices or openings therein from any adhering flour. Any lumps in the flour will be carried by the cleats over the upper roller and will fall back into the casing.

The space below the inclined front wall of the flour-bin forms a compartment which may be used as a receptacle for pans or other articles. Access is had to this compartment by means of the doors 2.

Having thus fully described our invention, what we claim is—

1. In a kitchen-cabinet, the combination with the casing and the flour-bin, of the vertical elevator-casing having an opening at its front upper end, the roller at the lower end of the elevator-casing and within the flour-bin, the roller journaled in the upper end of the elevator-casing above the opening and located in a different vertical plane from said lower roller, the endless elevator-belt passing around said rollers under tension, the cleats or slats secured thereto, and the inclined sieve secured over the opening at the upper end of the elevator-casing, the construction being such that as the endless belt is operated the cleats will elevate the flour and will also serve as knockers to vibrate the inclined sieve, substantially as described.

2. The combination with the cabinet having the sides and back extended upwardly and the sides of said cabinet having their front upper edges beveled or inclined and the removable top, of the extensible slide comprising the arms passing through apertures in the cabinet and their outer ends connected by a transverse bar, the lugs on the inner ends of said arms, the cleats secured to the cabinet, and the transverse bar secured to the exterior of the cabinet above the slide, substantially as specified.

In testimony whereof we affix our signatures in presence of two witnesses.

WILLIAM H. HERRICK.
HARRY C. CROSSLEY.

Witnesses:
WM. MUNROE,
JAMES DOLAN.